United States Patent
Siwak et al.

(10) Patent No.: US 7,281,615 B2
(45) Date of Patent: Oct. 16, 2007

(54) WEIGHT DETERMINING MECHANISM FOR A BACKPACK OR OTHER LUGGAGE

(75) Inventors: Greg Siwak, St. Louis, MO (US); Aaron Gorga, St. Louis, MO (US)

(73) Assignee: TRG Accessories, L.L.C., St. Louis, MO (US)

( * ) Notice: Subject to any disclaimer, the term of this patent is extended or adjusted under 35 U.S.C. 154(b) by 143 days.

(21) Appl. No.: 10/737,198

(22) Filed: Dec. 16, 2003

(65) Prior Publication Data

US 2005/0051586 A1    Mar. 10, 2005

Related U.S. Application Data

(60) Provisional application No. 60/433,693, filed on Dec. 16, 2002.

(51) Int. Cl.
*A45C 15/00* (2006.01)
*A45C 13/00* (2006.01)
*A45C 13/30* (2006.01)

(52) U.S. Cl. .............. 190/39; 190/102; 190/115; 16/114.1; 177/148; 177/245; 224/576

(58) Field of Classification Search .......... 190/39, 190/115, 100, 102; 177/148, 245; 16/113.1, 16/114; 224/576
See application file for complete search history.

(56) References Cited

U.S. PATENT DOCUMENTS

| | | | | | |
|---|---|---|---|---|---|
| 944,366 | A | * | 12/1909 | Knapp | 190/39 |
| 1,979,978 | A | * | 11/1934 | Martin | 190/115 |
| 2,518,973 | A | * | 8/1950 | Atherton | 190/102 |
| 2,710,083 | A | * | 6/1955 | White | 190/102 |
| 2,759,577 | A | * | 8/1956 | White | 190/102 |
| 2,937,016 | A | * | 5/1960 | Westman | 177/156 |
| 3,090,454 | A | * | 5/1963 | Farrar et al. | 177/131 |
| 3,572,870 | A | * | 3/1971 | Marks et al. | 312/244 |
| 4,223,819 | A | * | 9/1980 | Wright | 224/153 |
| 4,660,666 | A | * | 4/1987 | Reder et al. | 177/148 |
| 5,581,901 | A | * | 12/1996 | Takahashi | 33/756 |
| 5,887,770 | A | * | 3/1999 | Covell | 224/153 |
| 6,043,438 | A | * | 3/2000 | Helberg | 177/148 |
| 6,431,418 | B1 | * | 8/2002 | Pease | 223/61 |
| 2003/0127253 | A1 | * | 7/2003 | Heyn | 177/148 |

FOREIGN PATENT DOCUMENTS

| | | | |
|---|---|---|---|
| DE | 2721518 B1 | * | 2/1978 |
| DE | 29617487 U1 | * | 1/1997 |
| DE | 20210055 U1 | * | 10/2002 |
| GB | 2385142 A | * | 8/2003 |
| WO | WO 8404027 | * | 10/1984 |
| WO | WO 98/31250 | * | 7/1998 |
| WO | WO 98/59223 | * | 12/1998 |
| WO | WO 03100360 A1 | * | 12/2003 |

* cited by examiner

*Primary Examiner*—Sue A. Weaver
(74) *Attorney, Agent, or Firm*—Armstrong Teasdale LLP (57) ABSTRACT

A weight determining mechanism and a method for determining the weight of a piece of loaded luggage, particularly a backpack. The mechanism is generally incorporated into a carry handle of the piece of luggage allowing for it to be integral with the luggage and allowing for it to not take up additional space while allowing for quick and easy weight determinations without need for an external scale.

24 Claims, 8 Drawing Sheets

WEIGHT DETERMINING MECHANISM FOR A BACKPACK OR OTHER LUGGAGE

CROSS REFERENCE TO RELATED APPLICATION(S)

This application claims priority to U.S. Provisional Application Ser. No. 60/433,693 filed Dec. 16, 2002, the entire disclosure of which is herein incorporated by reference.

BACKGROUND OF THE INVENTION

1. Field of the Invention

This disclosure relates to the field of weight determining mechanisms for use with luggage; in particular to weight determining mechanisms carried on-board a piece of luggage to determine the loaded weight of the piece of luggage.

2. Description of the Related Art

Recently, the study of injury done to the human body through everyday activities has become a field of increasing importance. The sudden rise of repetitive stress injuries in the last few years and a greater understanding of the damage that can be done to the human body by common tasks has led many people to try to determine safer ways to carry out their everyday lives. Potential dangers from everyday activities are particularly troubling when they occur during childhood, where a growing body may be less likely to recover from an injury and where an injury can potentially alter a person's whole life.

One area of everyday injury that has recently caught attention is back injury from carrying or lifting overly heavy loads. This is particularly a problem for school children where scientists have determined that many kids carry far too much weight in their backpacks to and from classes in order to transport school books and school supplies. Many experts recommend that a child carry no more than 15% of their body weight in a backpack to avoid an increased risk of musculoskeletal injury and particularly damage to the spine.

The above concerns are proving disturbing to many parents and school officials. In some areas, the concern has reached such a fevered pitch that school districts are being asked to find cost effective means for reducing the load of school children's backpacks. While such procedures may be necessary for preventing school children from taking home more weight than they should be carrying in order to complete assignments, the best way to prevent danger from overloaded backpacks is to directly determine if a particular load, in a particular pack, is too heavy for a particular child to be carrying. The load can then be adjusted or carried in multiple different bags or the child can be helped by an adult to carry the supplies needed.

While placing the backpack on a traditional scale, or similar weight determining device, would be suitable for determining the weight of a backpack, these systems are generally clunky and it can be difficult to have a scale available to weigh the backpack for every child every day as would generally be required to insure that the backpack is not overloaded.

Weight in backpacks is not the only place where knowledge of the weight of luggage is valuable. When traveling, particularly via aircraft to international destinations, many airlines impose weight restrictions on luggage in order to protect their workers from injury and to insure that the aircraft is not overloaded. While the airlines can efficiently weigh the bags upon check-in, the traveler often does not have any idea if their bag will be too heavy before it is too late. By the time the airline weighs the bag and determines it is overly heavy, the traveler is often not able to transfer the contents to another piece of luggage to decrease the weight, or to leave various items at home because they are already at the airport and may not have any other luggage with them into which to transfer the overweight luggage contents. Therefore, the traveler is forced to pay overweight baggage fines and baggage handlers are required to lift the heavy bags. Even if they are able to repack, the traveler must go through the inconvenience of trying to repack at the airport where they are under time constraints, their luggage is not as easily accessible as it is at home, and they risk theft of luggage contents.

SUMMARY

Because of these and other problems in the art, described herein are systems and methods for providing a weight determining mechanism in the structure of a backpack or other piece of luggage, particularly in the carry handle, to allow for a user to quickly and easily determine the weight of the backpack or other luggage without the need for using an external weighing mechanism.

Described herein, in an embodiment, there is a weight determining mechanism for a piece of luggage, the mechanism comprising: a grip, which may be a portion of a carry handle; at least one resistance mechanism, wherein the resistance mechanism is altered by the application of force on the resistance mechanism, the resistance mechanism being integrally attached to a piece of luggage and to the grip so that the weight of the luggage comprises the application of force on the resistance mechanism when the luggage is lifted by the grip; and at least one indicator, wherein the indicator provides an indication of the weight of the luggage based on the alteration of the resistance mechanism.

In an embodiment the piece of luggage comprises a backpack, a suitcase, or a shoulder bag.

In an embodiment, the resistance mechanism may comprises at least one coil spring which may be attached to the luggage via at least one mounting strip which may be attached towards the opposing ends of the grip. The resistance mechanism may be located within a hollow interior of the grip.

In an embodiment, the mounting strip is attached to the luggage by having an elongated hole located toward a first end of the mounting strip and placed around a rivet which is in turn connected the exterior surface of the luggage. In turn, the mounting strip may attached to the resistance mechanism, which may be, but is not limited to, a coil spring which may be located in the hollow interior of the grip, at a second end spaced from the first end.

In an embodiment the indicator comprises a series of markings on the mounting strip such as, but not limited to, numbers or color bands of any colors including, without limitation, red, green and yellow. The series of markings may be selectively revealed from within the hollow interior of the grip such that the last of the series of markings so revealed indicates the weight of the piece of luggage.

In another embodiment, there is herein described, a weight determining mechanism for a piece of luggage, the mechanism comprising: means for lifting the piece of luggage, the means for lifting being an integral part of the luggage; means for determining the weight of the piece of luggage, the means for determining being included within the means for lifting; and means for providing an indication of the weight to a user.

BRIEF DESCRIPTION OF THE FIGURES

FIG. 4 shows multiple views of an embodiment of a carry handle including an embodiment of a weight determining mechanism utilizing mechanical operation. FIG. 4A shows a side (FIG. 4A-1) and a cutaway top (FIG. 4A-2) view of the embodiment with the handle stowed and not in use. FIG. 4B shows similar views (FIG. 4B-1 and FIG. 4B-2) with the luggage lifted by the carry handle and the weight determining mechanism indicating the weight of the empty bag. FIG. 4C shows similar views (FIG. 4C-1 and FIG. 4C-2) with some additional weight in the luggage and FIG. 4D shows similar views (FIG. 4D-1 and FIG. 4D-2) with the luggage overloaded. FIG. 4 is cross-hatched for color, where appropriate.

FIG. 5 shows multiple views of an embodiment of a carry handle including an embodiment of a weight determining mechanism utilizing digital operation, wherein

FIG. 6 shows multiple views of another embodiment of a carry handle including an embodiment of a weight determining mechanism utilizing digital operation, wherein

FIG. 7 shows multiple views of another embodiment of a carry handle including an embodiment of a weight determining mechanism utilizing digital operation, wherein

FIG. 8 shows multiple views of another embodiment of a carry handle including an embodiment of a weight determining mechanism utilizing digital operation, wherein

DESCRIPTION OF PREFERRED EMBODIMENT(S)

Discussed herein are systems and methods for determining the weight and/or mass of a piece of luggage, such as, but not limited to a backpack, through the use of a scale which is built into the luggage as a part of a carry handle. While this luggage will generally be a backpack, one of ordinary skill in the art would understand that the principles, methods, and systems disclosed herein can be readily adapted to other types of luggage whose weight is desired to be known such as, but not limited to, suitcases, briefcases, computer bags, duffel bags, upright bags, garment bags, shoulder bags or any other type of luggage. Further, while the weight determining mechanism is built into a carry handle in the depicted embodiments, one of ordinary skill in the art would also understand how the principles, methods and systems could be adapted to include the weight determining mechanism in any type of handle, or as a device separate from a handle.

Figure 1:
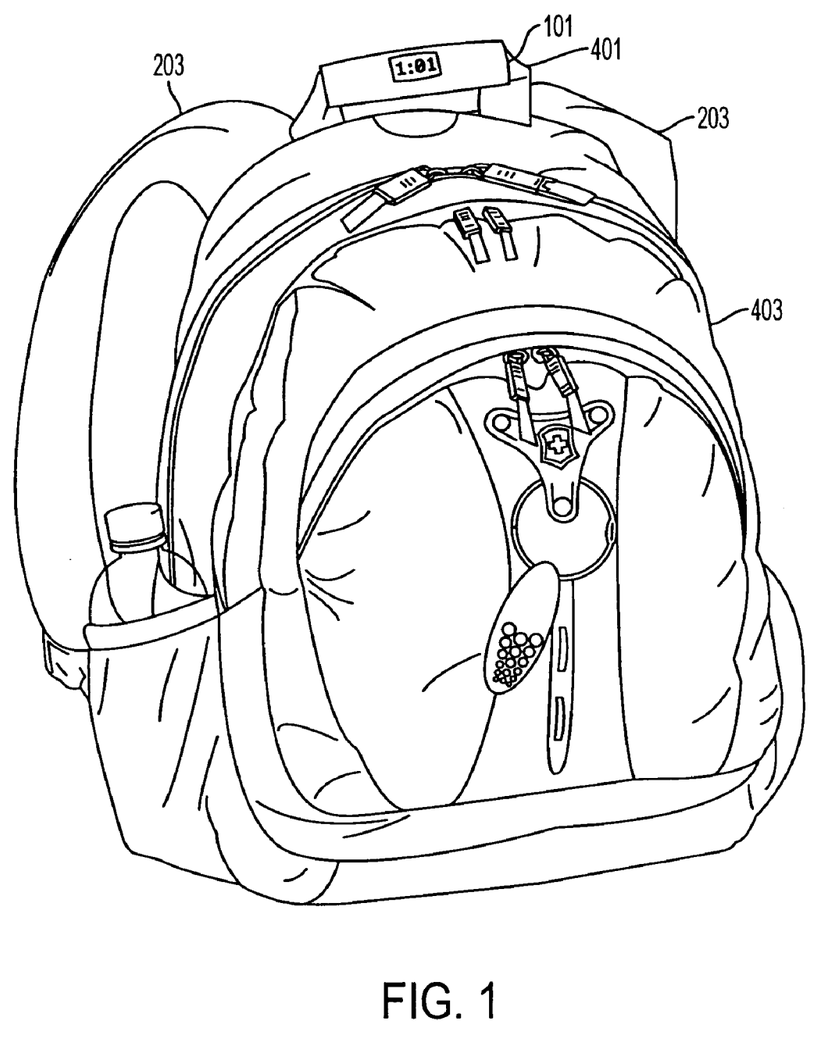
FIG. 1 shows a backpack including a carry handle with an embodiment of a weight determining mechanism.
Figure 2:
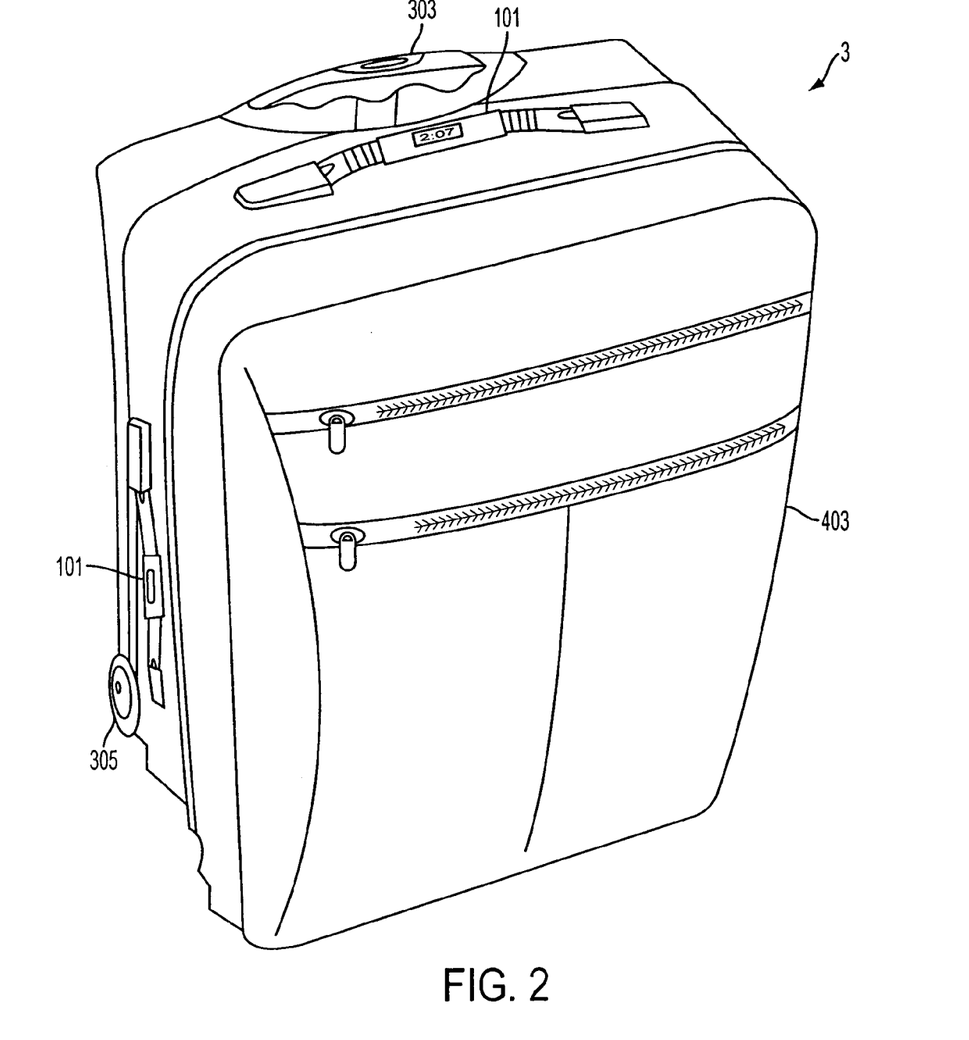
FIG. 2 shows a suitcase including a carry handle with an embodiment of a weight determining mechanism.
Figure 3:
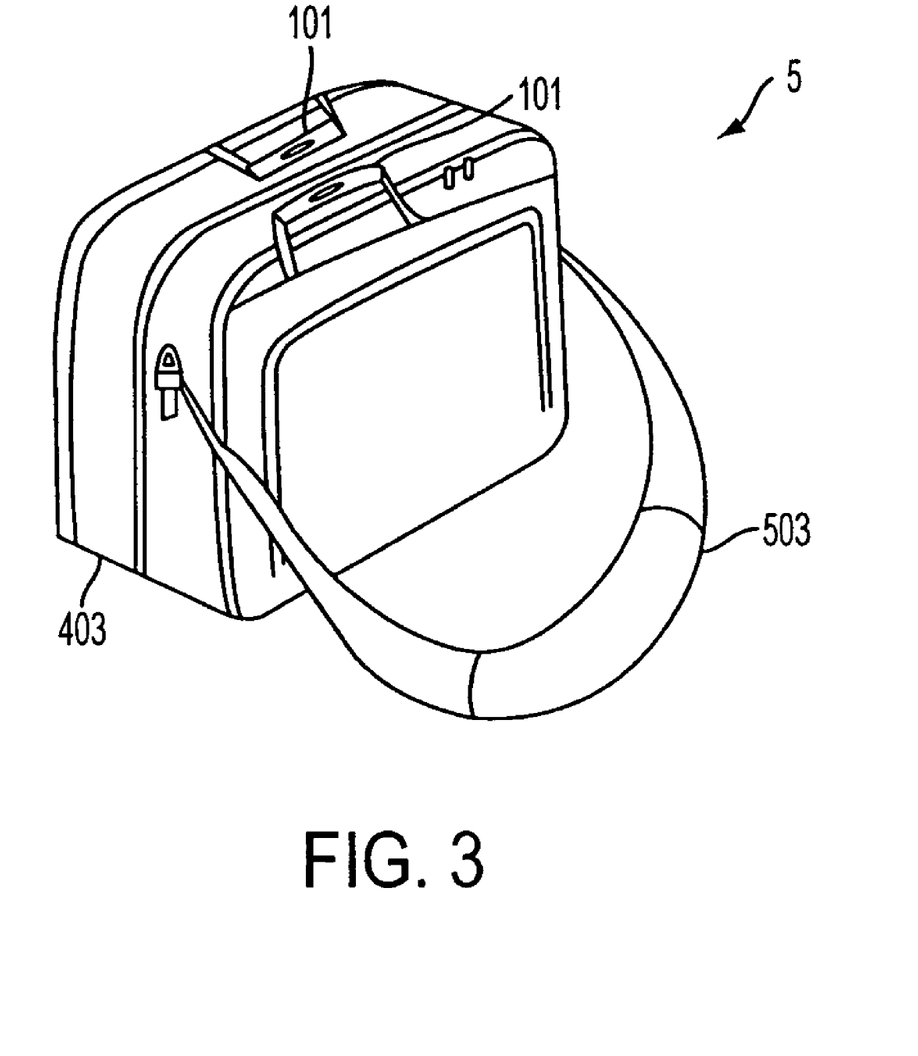
FIG. 3 shows a shoulder bag including a carry handle with an embodiment of a weight determining mechanism.

As seen in FIGS. 1-3, most luggage such as backpack (1), suitcase (3), or shoulder bag (5) has some type of carry handle (101) which allows the user of the luggage to carry the luggage in their hands. These carry handles (101) are generally designed to be gripped by the user in their hand for lifting the luggage up over obstacles or for transporting the luggage for a short distance. A carry handle (101) supports the weight of the luggage at its point of connection to the luggage and distributes the weight across the user's hand through a grip.

The carry handle (101) is often supplemented by another type of carrying device to allow for the luggage to be transported in a different and generally more comfortable manner. For instance, backpack (1) includes carry handle (101) which allows the user to pick up the backpack (1) with a hand as the carry handle (101) is generally arranged to be at the top of the backpack (1) when the backpack (1) is resting in a steady position on the floor. The backpack (1) also includes two shoulder straps (203) which are designed to go over a user's shoulders to allow the container portion (403) of the backpack (1) to be carried against the user's back with the weight of the backpack (1) supported by the user's shoulders. The backpack (1) may also include a hip strap (not shown) to go around the user's waist to allow for some of the weight to be carried on the user's hips to lighten the force on the shoulders.

The suitcase (3), on the other hand, includes two carry handles (101) which may be used for carrying the suitcase (3) over bumps or up stairs. The suitcase (3) may also include an expandable tow handle (303) allowing the suitcase (3) to be dragged on the attached wheels (305) without having to lift the weight of the entire suitcase. One of ordinary skill in the art would understand that some pieces of luggage actually combine the features of the wheeled suitcase with other carry mechanisms such as the product shown in U.S. patent application Ser. No. 09/604,995 the entire disclosure of which is herein incorporated by reference.

The shoulder bag (5) is similar to the backpack (1) in that the weight of the bag, in its primary transport mode, is designed to be supported by the shoulders of the user. The shoulder bag (5), however, instead of holding the load against the back, allows the shoulder bag (5) to hang between the arm and the torso, generally at about waist height. Therefore, the shoulder bag (5) includes a single shoulder strap (503) for carrying the shoulder bag (5) over one shoulder with the strap (503) either hanging downward approximately parallel to the arm and over the same shoulder under which the bag hangs, or may lay across the chest and back supporting the shoulder bag (5) on the shoulder opposite the one it is carried under.

As should be apparent from FIGS. 1-3, the carry handles (101) may be used as the primary method of transport for the luggage, or may be secondary and used only to pick up the luggage or to carry the luggage under limited circumstances which is the way they would generally be used. In must luggage, handles such as carry handles (101) are generally intended for limited use and in particular situations although sometimes are the principle carry mechanism.

In an embodiment, the carry handle (101), is designed to incorporate a weight determining mechanism (901), particularly a scale, so that when the luggage is picked up and supported by the carry handle (101), the weight of the piece of luggage can be readily determined or estimated by the user. In another embodiment, the weight determining mechanism (901) may be incorporated into the shoulder straps (203), tow handle (303), shoulder strap (503) or any other carrying device whether or not designed to be gripped by the hand during standard transport, gripped by the hand to get a weight determination even if not regularly carried that way, or engaging another part of the body (for example the shoulder) when the weight is being determined. In still another embodiment, the handle incorporating the weight determining mechanism (901) may be designed purposefully for use only in weighing the piece of luggage and may not be suitable for transport of the piece of luggage. The integration of the weight determining mechanism (901) in the carry handle (101) is, however, preferable for two reasons. One, it allows integration in an inconspicuous manner and in an already existing structure, and second it allows for easy use of the weight determining mechanism (901) by picking up the luggage with the carry handle (101) in the standard manner, while also not requiring the weight determining mechanism (901) to measure on a relatively constant basis when the luggage is in use. This limits the possibility of damage to the weight determining mechanism (901).

FIG. 4A-1 shows an embodiment of a carry handle (101), including functional elements, for determining the weight of a piece of luggage such as those shown in FIGS. 1-3. The carry handle (101) includes components which allow it to function as a scale when the luggage is lifted by the carry handle (101). In the depicted embodiment, the weight determining mechanism (901) is designed to be purely mechanical.

Figure 4A:
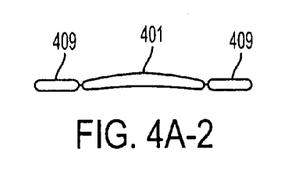
Figure 4A:
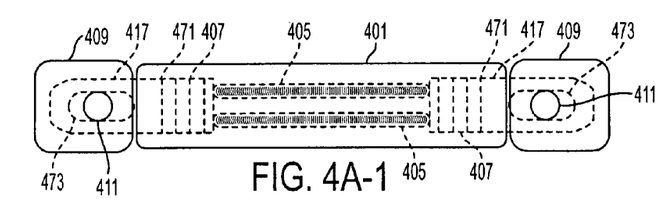
Figure 4B:
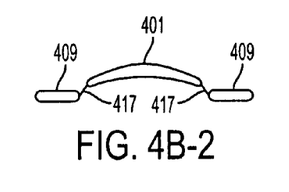
Figure 4B:
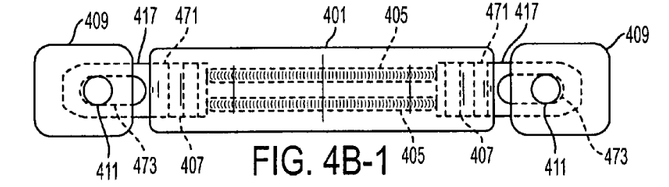
Figure 4C:
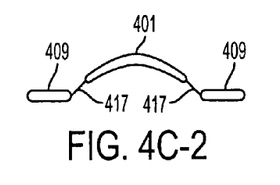
Figure 4C:
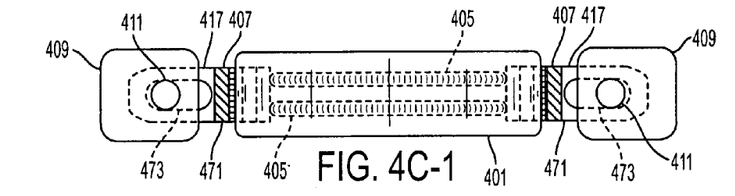

The handle (101) generally includes a grip (401) which may be comprised of fabric, leather or other animal skins, rubber, or any other materials as is known to one of ordinary skill in the art. The grip (401) is generally designed to be grasped by the human hand for lifting the luggage from a surface that it rests on and may be sized and shaped to distribute force over the portion of the hand gripping it. The grip (401) may be externally formed or molded to conform to the hand when gripped. The grip (401) will generally replace the handle grip used in a traditional piece of luggage as the carry handle (101). The grip (401) generally will be elongated in shape and have a hollow interior which extends to openings in both the ends through which the mounting strips (417) can pass. This embodiment presumes that the principal components of the weight determining mechanism (901) are in the grip, which is preferred, but by no means required.

The grip (401) is attached to the luggage by a pair of mounts (409) which are attached to the piece of luggage. In the depicted embodiment, the mounts (409) are secured to the luggage by means of rivets (411) or screws which serve to hold each mount (409) rigidly to the exterior surface of the luggage. The grip (401) is attached to the mounts (409) through the weight determining mechanism (901). The weight determining mechanism (901) comprises at least one resistance mechanism (405) and at least one indicator (407).

In the depicted embodiment, two indicators (407) are used each of which is mounted on a mounting strip (417). The resistance mechanism (405) comprises one or more coil springs (in the depicted embodiment two are used) attached at each end to one of the mounting strips (417) and encased within the hollow interior of the grip (401). The resistance mechanism (405) may comprise, however, any type of device which can provide a returning force positioned so that the returning force attempts to return the grip (401) and mounts (411) to the position shown in FIG. 4B (or FIG. 4A). In a still further embodiment, the resistance mechanism (405) may simply solidly resist movement, but can detect the amount of force being applied to it (such as through electrochemical changes or similar processes).

Each mounting strip (417) comprises a main body (471) with the indicator (407) printed thereon and an elongated loop (473). The loop (473) is held around the rivet (411) allowing for the mounting strip (417) to slide relative to, and generally inside a hollow interior of, the mount (409) by having the rivet (411) transverse the inside area of the loop (473). In an alternative embodiment, only one mounting strip (417) need be used with the other side of the grip (401) being rigidly attached to the mount (409) through any mechanism known to one of ordinary skill in the art. The indicators (407) provide the user with an indication of weight of the luggage when holding the luggage by the grip (401). In the depicted embodiment, the indicators (407) comprise a series of markings. In the depicted embodiment, color bands of green, yellow and red moving from that closest to mount (409) to that farthest away are used. The indicator (407) is selectively revealed as the mounting strip (417) slides into and out of the hollow interior of the grip (401) through the opening on the appropriate end.

It should be apparent from FIG. 4A-1 and the above description that how much of the indicator is visible to the user of the luggage depends on the extension of the coil springs which comprise the resistance mechanism (405) in this embodiment. In particular, because the structures are of fixed dimensions with the exception of the coil springs, as the length of the coil springs increases, more of the mounting strip (417) is "pulled" from within the hollow interior of the grip (401) making more indicator (407) visible. Further, the extension of the coil springs is dependent on the force applied on them and that force in turn depends on the weight of the luggage imparted on mountings (409) and imparted to the mounting strips (417) when the grip (401) is held solidly in the hand and the luggage supported thereby.

In operation, when a user picks up the luggage by the grip (401) the downward force generated by the weight of the luggage on the mounts (409) will cause the mounting strips (417) to be pulled out of the grip (401). This force will in turn cause the resistance mechanism (405) to alter its structure to resist the weight. In this case it causes the coil springs to extend in length until the returning force of the springs is sufficient to cancel the weight of the luggage at which point a steady state is reached. As is well known in physics, the force generated by a stretched spring attempting to restore itself is proportional to the extended length.

As the downforce generated by the luggage increases (because the weight of the piece of luggage increases) the alteration of the resistance mechanism (405) increases and the greater extension of the resistance mechanism (405) to equalize the forces. In the depicted embodiment, as the weight increases, the coil springs will extend and increase in length. As they increase in length, the main body (471) of the indicator strips (407) will slowly be revealed from within the hollow interior of the grip (401). At equilibrium, which occurs when the luggage is not bouncing on the springs, the weight of the luggage and its contents can be determined by knowing the distance of the coil springs' extension and the values of various known constants related to the springs' construction.

The indicators (407) placed on the main body (473) of the mounting strips (417) are therefore arranged so that the color of strip which is the last revealed from the hollow interior of the grip (401) indicates the approximate weight of the bag. This is shown in the progression of FIGS from FIG. 4B-1, 4C-1, 4D-1 and 4B-2, 4C-2 and 4D-2. In FIGS. 4B-1 and 4B-2, the positioning of the grip (401) relative to the indicator (407) is such that no color is yet visible. This is the positioning which may be associated with lifting of the empty luggage. This indicates that no weight has been placed in the luggage. Only the weight of the luggage is included and the load weight is not yet in question. In FIGS. 4C-1 and 4C-2, the luggage has had a certain amount of weight placed in it, and the weight is sufficient that the entire green strip is visible, as is a portion of the yellow strip. This would indicate that the luggage may have gone from a clearly safe loaded value (where only green was visible), to the point where there is a question about the weight, or that the luggage is approaching a target weight because the portion of indicator (407) that is yellow is visible.

Figure 4D:
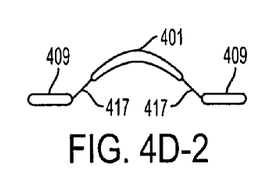
Figure 4D:
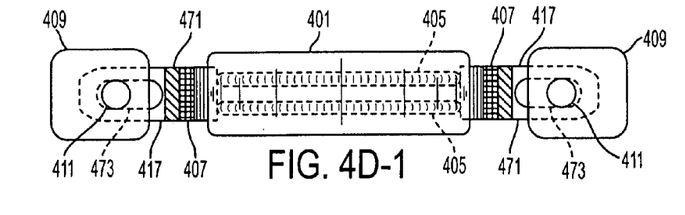
Figure 5A:
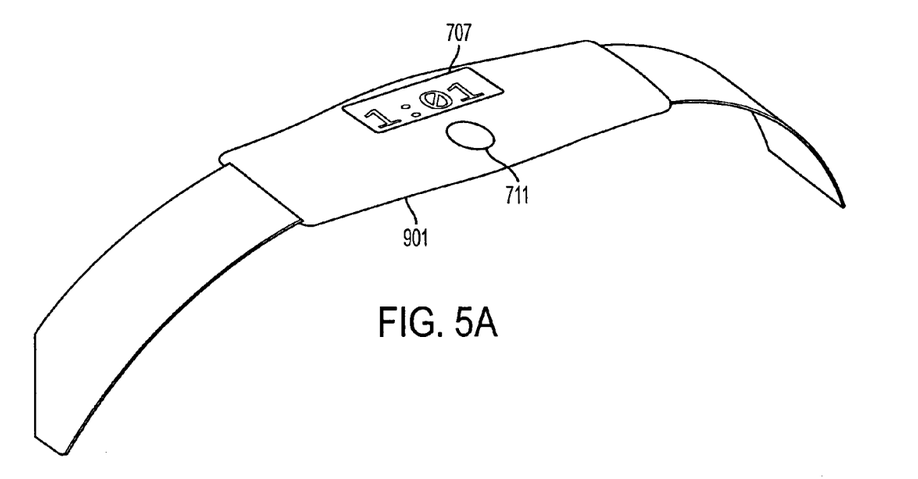
FIG. 5A is a perspective view of the handle.
Figure 5B:
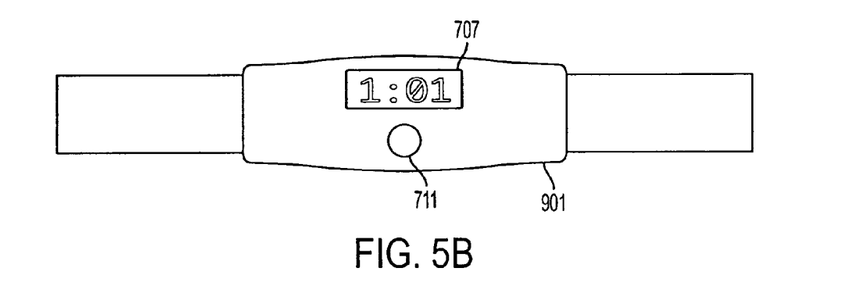
FIG. 5B is a top plan view of the handle.
Figure 5C:
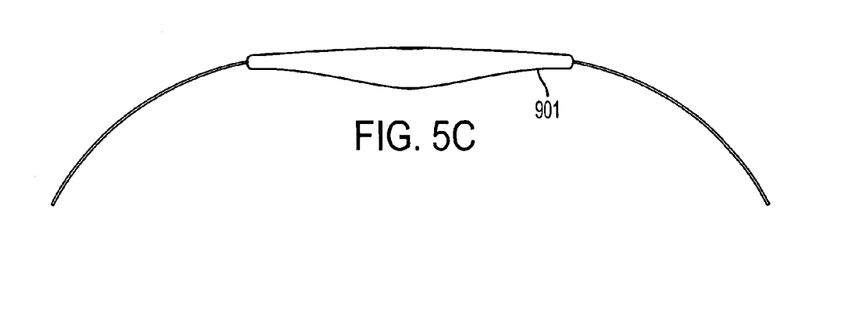
FIG. 5C is a side elevational view of the handle.
Figure 6A:
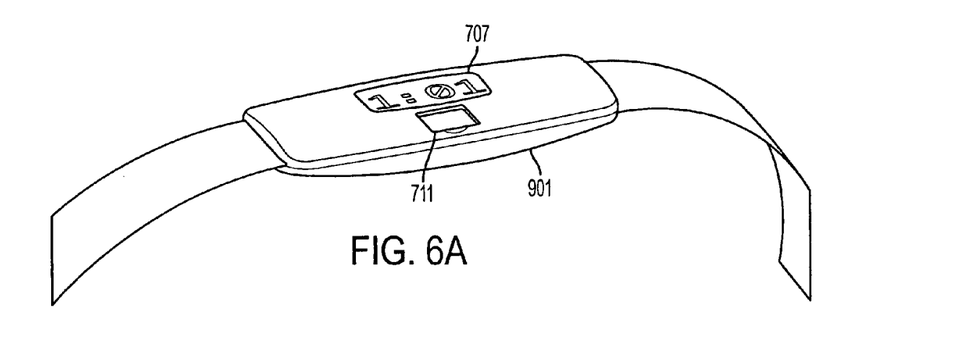
FIG. 6A is a perspective view of the handle.
Figure 6B:
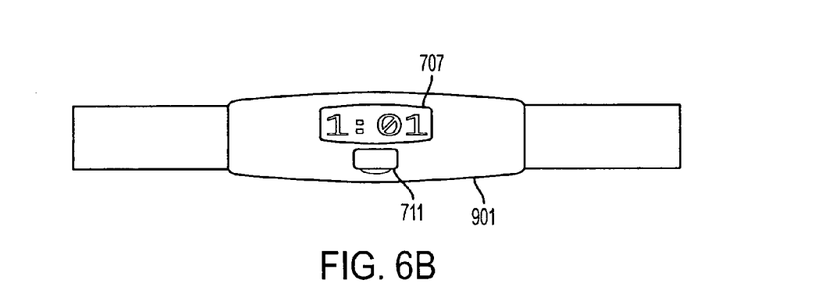
FIG. 6B is a top plan view of the handle.
Figure 6C:
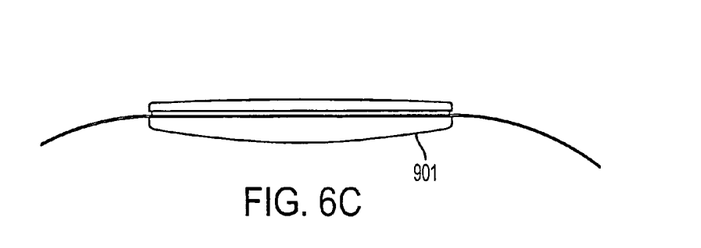
FIG. 6C is a side elevational view of the handle.
Figure 7A:
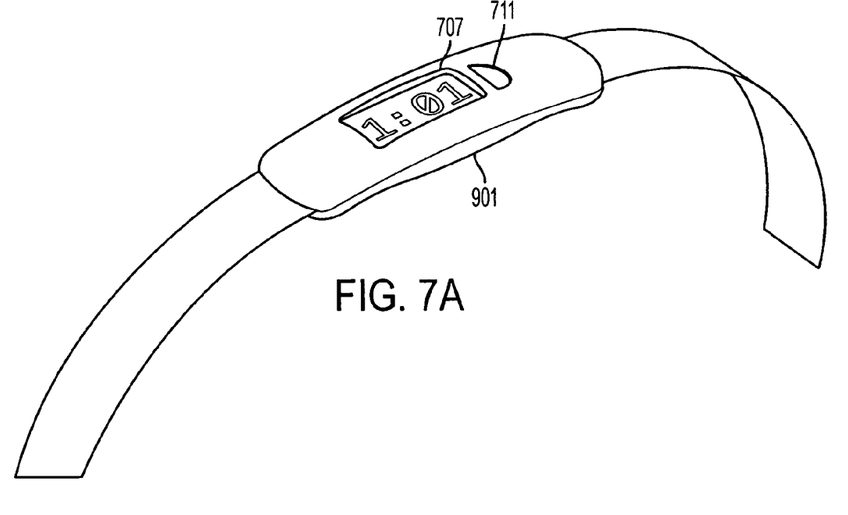
FIG. 7A is a perspective view of the handle.
Figure 7B:
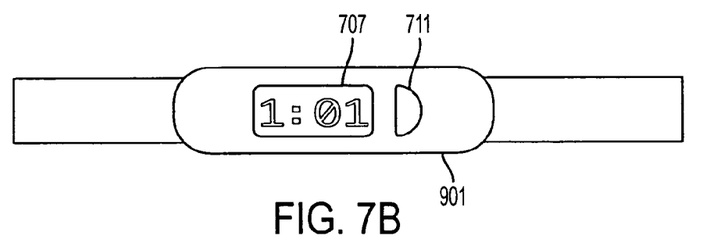
FIG. 7B is a top plan view of the handle.
Figure 7C:
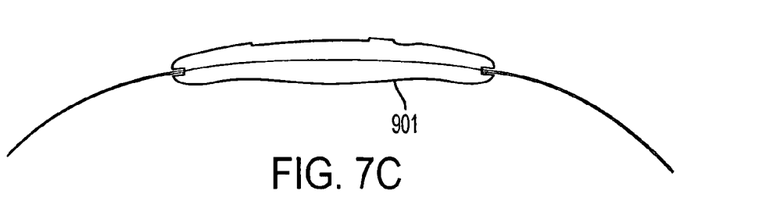
FIG. 7C is a side elevational view of the handle.
Figure 8A:
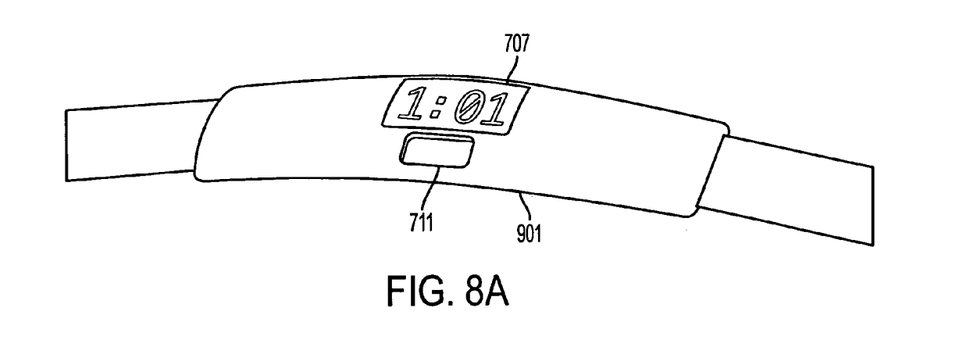
FIG. 8A is a perspective view of the handle.
Figure 8B:
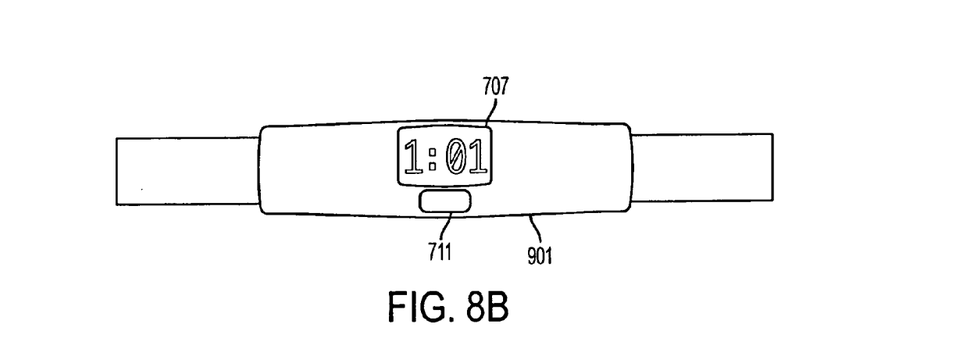
FIG. 8B is a top plan view of the handle.
Figure 8C:
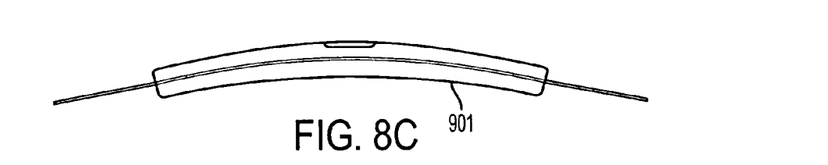
FIG. 8C is a side elevational view of the handle.

In FIGS. 4D-1 and 4D-2, all three of the color strips are visible leading to red being the last color revealed. At this point, the luggage is generally indicated to be overloaded. In particular, the bag may be too heavy to safely carry, or may be over standard airline weight restrictions depending on the embodiment of indicator used. This would indicate to the user, simply from picking up their bag, that they should consider reducing the weight of its contents before traveling, before carrying the luggage, or before allowing a child to carry the backpack.

The indicators (407) used in the depicted embodiment are merely exemplary of what could be used and can represent particular weight ranges. For instance, the green range may indicate that the luggage weighs less than 30 pounds while the yellow indicates that the bag is between 30 and 50 pounds (heavy), and the red (and above) range indicates the bag is over 50 pounds (overly heavy). In another embodiment, the color strips may be replaced with numerical indicators, such as, but not limited to, weights in pounds or kilograms, or other indicators to provide information about the weight to the user.

In a still further embodiment, the indicator (407) need not be used directly on the mounting strip (417) using how much of the mounting strip (417) is visible from under the grip (401) to indicate weight. For example, the mounting strip (417) may be rigidly attached to the grip (401) but be attached to a rotational dial in the mount (409) which dial resists rotation by an amount proportional to its distance of rotation. In this way, supporting the luggage by the grip (401) results in the mounting strip (417) rotating the dial to a level indicative of the weight of the luggage.

FIGS. 5-8 show another embodiment of a carry handle including a weight determining mechanism (901). In these embodiments, the purely mechanical structure of FIG. 4A-1 is replaced with a structure where the applied force is reported using electrical signals and in particular a digital numerical output. In these embodiments, the actual weight of the luggage may be reported on display indicator (707). Further, the system may include a reset or re-zero button (711) which may allow the user to determine the weight of the luggage while loaded and independently the weight of the contents of the luggage and the weight of the luggage itself. This may be particularly useful for determining the weight of what is being carried (as opposed to the weight of the luggage and the contents together) as this may be a better indicator of the difficulty to lift the luggage. The digital display indicator (707) may be controlled using a similar underlying resistance mechanism (405) as used in FIG. 4 or electromechanical force detection means or other mechanisms may be used instead.

In operation, an embodiment of the system works as follows. A user loads the container portion (403) of a piece of luggage with the materials that they desire to carry in the luggage. The user then picks up the luggage by the carry handle (101), specifically by grabbing the grip (401) in their hand, and raises the luggage from the surface on which it is resting by exerting a force with their arms. Once the luggage has cleared the surface which was supporting it and is solidly supported by the user, the user waits until the resistance mechanism (405) has reached an equilibrium state (if it is of a type which could "bounce"). At equilibrium, the user examines the indicator (407) or digital indicator (707) which provides a display indicative of the weight of the luggage based on the resistance being imposed by the resistance mechanism (405). The user can then determine if the luggage meets the desired weight criteria. They would then proceed to carry the luggage using shoulder straps (203), tow handle (303) or shoulder strap (503), as appropriate.

While the above presumes that a single piece of luggage is being weighed, one of ordinary skill in the art would also recognize that the weight determining mechanism (901) may also be used to determine the total weight of multiple pieces of luggage (for instance all bags being taken on a particular trip), simply by connecting them together at a point attached to the mount (409) and then lifting the system using the carry handle (101) in the same manner but supporting all the weight on the mounts (409).

One of ordinary skill in the art would also recognize that the embodiments of FIG. 4-8 represent only exemplary embodiments of how the weight determining mechanism (901) can appear and can operate. While two coil springs are used as the resistance mechanism (405) in FIG. 4, one of ordinary skill in the art would recognize that any number of coil springs may be included. In still another embodiment, coil springs need not be used at all but the weight of the luggage at the connection of the carry handle (101) may be measured by changes in other systems. For instance, in another embodiment any number or combination of resistance mechanisms (405) such as, but not limited to, elastic materials, coil springs, flat springs, magnetic or electric fields, chemical reactions, or any other type of object, system or device which can measure a force can be used. In still another embodiment, the resistance mechanism (405) may be internal to mount (409) instead of located inside the hollow interior of the grip (401) while still allowing similar operation. The resistance mechanism (405) and mounting strip (417) may also or alternatively be encased within a protective or decorative cover to provide for improved aesthetic appearance.

Further, while the above described embodiments presume that the weight determining mechanism (901) is incorporated into a carry handle (101), in another embodiment, the weight determining mechanism (901) may be included in any handle, hand grip, support, strap, or carrying device attached to the luggage whether added purely to allow the weighing operation or which already exists on the luggage for transport, lifting, or any other reason. In still another embodiment, the weight determining mechanism (901) may be designed to be decorative and/or to provide additional functionality such as shock absorption in the carry handle (401) while the luggage is being transported.

In still another embodiment, a single weight determining mechanism (901) can be used to show a total weight associated with the luggage, or multiple weight determining mechanisms may be used in a single piece of luggage to determine the weight carried at multiple points on the luggage. For instance, in backpack (1), a weight determining mechanism (901) could be included in each shoulder strap (203) to determine how much weight each shoulder is supporting when the backpack (1) is being carried by the user. This can allow for the user to determine if the backpack (1) is evenly packed with weight distributed in a manner so that one shoulder is not supporting more weight than the other when the backpack (1) is in use.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A piece of luggage comprising:
   a luggage container portion;
   a generally flexible lifting element mounted to the luggage container portion and forming an integral part of the container portion;
   an on-board weight determining mechanism permanently connected to the lifting element and subject to a load bearing weight of the container portion when lifted via the lifting element, the weight determining mechanism operable to determine the load bearing weight; and
   a display mounted stationary to the luggage container portion, the display operatively coupled to the weight determining mechanism to indicate, without a moving mechanical element, the load bearing weight to a user when the container portion is lifted via the lifting element.

2. A piece of luggage comprising:
   a luggage container portion;
   a generally flexible lifting element mounted to the luggage container portion and forming an integral part of the container portion;
   an on-board weight determining element permanently connected across opposing ends of the lifting element, the weight determining element responsive to a load bearing weight of the container portion when lifted via the lifting element to determine the load bearing weight; and
   a selectively operable indicator operatively coupled to the weight determining element to indicate information regarding the load bearing weight to a user when the container portion is lifted via the lifting element;
   wherein the indicator comprises a digital display.

3. A weight determining mechanism for a piece of luggage, the mechanism comprising:
   a carrying device designed to engage a part of a human body;
   at least one resistance mechanism having opposing first and second ends, wherein said resistance mechanism is altered by an application of force on said resistance mechanism whenever the piece of luggage is lifted via the carrying device, said resistance mechanism being coupled to the piece of luggage at the first end and the second end so that the weight of said luggage provides said application of force; and
   at least one indicator viewable from an exterior of the of the luggage and responsive to alteration of said resistance mechanism when the luggage is lifted via the carrying device, wherein said indicator provides an indication of the weight of the piece of luggage.

4. The mechanism of claim 3 wherein said resistance mechanism is selected from the group of a coil spring, a rotational dial, an elastic material, a magnetic component, an electrical component, a chemical component reactive to lifting of the piece of luggage, and an electromechanical element.

5. The mechanism of claim 3 wherein said piece of luggage comprises one of a backpack, a suitcase, a briefcase, a computer bag, a duffel bag, an upright bag, a garment bag, and a shoulder bag.

6. The mechanism of claim 3 wherein said carrying device comprises one of a carrying handle, a handle grip, a support, a shoulder strap, and a hip strap.

7. The mechanism of claim 3 wherein said carrying device is generally flexible.

8. The mechanism of claim 3 wherein said resistance mechanism is attached to said piece of luggage via a mounting strip on one of said first and second ends, said mounting strip slidable relative to the piece of luggage when the piece of luggage is lifted via the carrying device.

9. The mechanism of claim 3 wherein said indicator is configured to display a first color corresponding to a first predetermined weight range, and a second color for a second predetermined weight range.

10. The mechanism of claim 3 wherein said indicator comprises a first indicator connected to said first end, and a second indicator connected to said second end.

11. The mechanism of claim 3 wherein said indicator comprises a digital display indicator.

12. The mechanism of claim 3 further comprising a reset or re-zero button, thereby facilitating independent determination of a weight of the piece of luggage and a weight of items loaded into the piece of luggage.

13. The mechanism of claim 3 wherein said indicator comprises a series of non-numerical markings.

14. The mechanism of claim 13 wherein said series of non-numerical markings are concealed within said carrying device until the piece of luggage is lifted, and said series of markings are selectively revealed to indicate the weight of said piece of luggage.

15. The mechanism of claim 3 wherein said indicator further comprises a mounting strip coupled to the resistance element and slidable into and out of an interior region of the carrying device, the mounting strip provided with a plurality of color bands that are respectively revealed when the piece of luggage is lifted under increasing amounts of weight, each of said plurality of color bands corresponding to a predetermined weight range and indicating a relative weight of the bag piece of luggage according to predetermined guidelines for a user.

16. The mechanism of claim 15 wherein said color bands comprise bands of red, yellow, and green.

17. The mechanism of claim 3 wherein said indicator comprises a series of numerical markings.

18. A weight determining mechanism for a piece of luggage, the mechanism comprising:
    means for lifting said piece of luggage, said means for lifting being an integral part of said piece of luggage;
    means for determining the weight of said piece of luggage, in response to an applied force on said means for lifting;
    means for providing an indication of the weight to a user;
    wherein said weight is distributed across said means for determining solely by lifting said means for lifting; and
    means for resetting or re-zeroing the means for determining, thereby facilitating independent determination of a weight of the piece of luggage and a weight of items loaded into the piece of luggage.

19. The mechanism of claim 18 wherein said piece of luggage comprises one of a backpack, a suitcase, a briefcase, a computer bag, a duffel bag, an upright bag, a garment bag, and a shoulder bag.

20. The mechanism of claim 18 wherein said means for determining is configured to detect an amount of force applied to the means for lifting whenever the piece of luggage is lifted via the means for lifting.

21. The mechanism of claim 18 wherein said means for determining comprises one of a spring means, rotational dial means, an elastic means, a magnetic means, an electrical means, a chemical means, an electrochemical means and combinations thereof.

22. The mechanism of claim 18 wherein the means for providing an indication of said weight to a user comprises one a color coded means, numerical marking means, non-numerical markings means, and a digital display.

23. The mechanism of claim 18 wherein the means for providing an indication of said weight to a user comprises means to indicate a predetermined range of weights to a user.

24. A weight determining mechanism for a piece of luggage, the mechanism comprising:

means for lifting said piece of luggage, said means for lifting being an integral part of said piece of luggage;

means for determining the weight of said piece of luggage, in response to an applied force on said means for lifting;

means for providing an indication of the weight to a user;

wherein the weight is distributed across said means for determining solely by lifting said means for lifting;

wherein the means for determining comprises a first end and a second end, each of the first and second ends being coupled to the piece of luggage, wherein the weight of the piece of luggage is carried across the means for determining when the piece of luggage is lifted via the means for lifting.

* * * * *